United States Patent Office 3,458,462
Patented July 29, 1969

3,458,462
PROPYLENE POLYMER AND OXYGENATED POLYETHYLENE-METAL COMPLEX POLYMER COMPOSITIONS
Donald E. Hostetler, Monroeville, Pa., assignor, by mesne assignments, to Dart Industries Inc., Los Angeles, Calif., a corporation of Delaware
No Drawing. Filed Nov. 25, 1966, Ser. No. 596,748
Int. Cl. C08f 27/04, 29/12
U.S. Cl. 260—23                10 Claims

ABSTRACT OF THE DISCLOSURE

Polymer compositions comprising a blend of about 1–20% of an oxygenated polyethylene-metal complex and 99–80% of a propylene polymer have improved dyeability and improved low temperature impact resistance.

The present invention relates to novel and useful polyolefinic compositions and to a process for producing them. More particularly, it relates to improved low temperature impact-resistant polypropylene compositions having improved dyeability properties and to processes for their preparation.

As is known, propylene can be polymerized to a high molecular weight, solid polymer by contacting propylene with a catalyst such as titanium trichloride/triethyl aluminum. Typical methods of preparing polypropylene are disclosed in Belgian Patent 538,782 and U.S. Patents 2,949,447; 2,911,384; and 2,825,721. Generally, such processes produce propylene polymers having a molecular weight ranging from about 50,000 to about 5,000,000 with the major proportion of the polymer being crystalline in that it exhibits a crystalline structure by X-ray analysis.

Crystalline polypropylene si well-known in the art for its highly desirable properties such as high tensile strength, high modulus of elasticity and good resistance to elevated temperatures. However, in spite of these desirable physical properties, crystalline polypropylene is known to have a particularly undesirable property in that it becomes quite brittle at low temperatures as described in U.S. Patent 3,018,263 and others. Since many of the articles molded or formed from crystalline polypropylene finds uses outside in cold weather or are in other ways to be subjected to low temperatures, it is highly desirable that the low temperature properties of crystalline polypropylene be modified so that it will not fail when subjected to stress at the lower temperatures. Crystalline polypropylene is also known to be resistant to dyeing operations and its surfaces are difficult to print, paint, or label without pretreatment of the polymer surface. These are formidable defects, especially in the fiber, film, food wrapping, and packaging industries.

It is an object of the present invention to provide a polypropylene composition which has improved low temperatures impact resistance as compared to polypropylene as heretofore produced. A further object is to provide a polypropylene composition with improved low temperature properties as well as having its other desirable properties. Another object is to provide a process for producing a polypropylene composition having improved dyeability. Another object is to provide a process for producing a polypropylene composition having the above properties which can be molded or processed in the same manner as conventional crystalline polypropylene. Other objects will become apparent as the description of the invention proceeds.

In summary, this invention provides an improved crystalline propylene polymer composition which is produced by melt blending about 1–20 weight percent of an oxygenated polyethylene-metal complex, based on the total polymer present, with the balance of the polymer comprising a propylene polymer. The propylene polymers employed in the present invention are crystalline homopolymers of propylene or crystalline copolymers of propylene and ethylene. The term "crystalline" is meant to include any polymer which exhibits crystallinity as measured by X-ray analysis of an annealed sample of such polymer. The polypropylene homopolymers or copolymers are employed in the compositions of the present invention, made by known procedures such as those hereinafter described. The copolymers can contain between about 0.2–40 percent by weight of ethylene. Generally the propylene polymers have intrinsic viscosities between about 1.0 to about 8.0. In a preferred embodiment of this invention a crystalline propylene homopolymer is emplyoed. Suitable methods for preparing such are disclosed in the above mentioned patents.

The propylene-ethylene copolymer which can be used in the blends of this invention can be either a block copolymer or a random copolymer. The block copolymer of ethylene and propylene can be prepared by any of the well-konwn methods of the art, one process which is eminently suitable being disclosed in French Patent 1,358,708 whereby a block copolymer of propylene and ethylene, having an average molecular weight of 50,000 to 5,000,000 is produced.

The random copolymer of ethylene and propylene can also be prepared by any one of the several methods known in the art, one process which is eminently suitable being disclosed in French Patent 1,352,024.

The oxygenated polyethylene-metal complex as used in this invention is a polymeric composition comprising in admixture:

(a) An oxidized polyethylene having a total chemically combined oxygen content in the range 0.20 to 7.5 weight percent oxygen and (b) From .2 to 50 percent by weight of the complex of a complexing agent selected from the group consisting of inorganic metal salts and metal salts of fatty acids, the fatty acid moiety containing at least 8 carbon atoms and metal chelates.

Complexing of the oxidized polyethylene is believed to occur through the reaction of the complexing agents with the functional oxygen groups, e.g., carboxyl, carbonyl, etc., on the oxidized polyethylene. In general sufficient complexing agent is added to allow reaction of all of the functional oxygen groups with the metal complex.

The metal in the metal complexing agent can be any polyvalent metal having a valence of at least two and being capable of reacting with a carboxyl group. Particularly suitable metals are the alkaline earth metals, e.g., calcium, magnesium and beryllium; earth metals, e.g., aluminum; transition metals, i.e., the metals in Group IV–B, V–B, VI–B, and VIII of the Periodic Table of Elements, such as titanium, vanadium, chromium, iron, cobalt, nickel, zirconium. Other suitable metals include tin, zinc, lead, copper, and cadmium. Operable inorganic metal salts are in particular the halides of the described metal, the halogen having an atomic number of 17 to 53. Particularly preferred are the chlorides. Other suitable inorganic salts include sulfates, phosphates, and nitrates. The metal salts of fatty acids suitable as complexing agents are preferably metal salts wherein the fatty acid contains from 16 to 22 carbon atoms. Suitable fatty acids include stearic, oleic, lauric, palmitic, and linoleic acid. Chelates suitably employed in the present invention are those of amino acids, ethylene diamines, 1,3-diketones, β-keto esters, hydroxyquinolines, phthalocyanines and porphyrins. Particularly preferred chelates are those of 1,3-diketones and β-keto esters.

Examples of operable metal salts of fatty acids include, but are not limited to: aluminum monosterate; aluminum distearate; aluminum tristearate; aluminum hydroxystearate; aluminum palmitate; aluminum octoate; tin (II) oleate; tin (II) octoate; and the like. Examples of metal salts operable in the instant invention include chromium chloride $CrCl_3 \cdot 6H_2O$, tin (II) chloride and the like. Operable examples of metal complexes useful in the instant invention include, but are not limited to, beryllium acetylacetonate; zinc acetylacetonate; aluminum acetylacetonate; ferric acetylacetonate; nickel acetylacetonate; magnesium acetylacetonate; calcium acetylacetonate; zirconium acetylacetonate; chromium acetylacetonate; titanium acetylacetonate; and the like.

The polyethylene can be oxidized by various methods well-known in the art such, for example, as disclosed in U.S. 3,155,644. As shown in U.S. 3,155,644, one method comprises passing oxygen-containing gas over a solid polyethylene disposed, for example, in an oven, at a temperature below the melting point of the polymer. Still another method comprises suspending particles of polyethylene in water or an organic solvent and either bubbling air through the suspension or pressurizing the system with air at temperatures ranging up to the melting point of the polymer. Yet another method comprises passing an oxygen-containing gas, e.g., air or oxygen-enriched air, at a temperature up to the melting point of the polymer, through a fluidized bed of polyethylene particles. A further method comprises pressing the polyethylene into film and thereafter passing hot air or other free oxygen-containing gas thereover at a temperature up to the melting point of the polymer.

The polyethylene to be oxidized can be produced by any one of a number of methods well-known in the art, and includes both high density polyethylene as claimed in U.S. Patent 2,816,883 and low density polyethylene as taught in U.S. Patent 2,153,553. Thus, polyethylene having densities in the range 0.91–0.980 g./cc., prior to oxidation, are operable in the instant invention, such polyethylenes having melting points ranging from about 90° C. for the low density material up to about 137° C. for high density polyethylene. In general the oxidation of the polyethylene is continued until the chemically combined oxygen content is in the desired range. The melt index of the polyethylene (ASTM–1238–52T) generally in the range of 0.0 to 25 for the starting material drops to a range of 5 to 1,000 as a result of the oxidation. The oxygenated polyethylene-metal complex is formed by admixing the oxygenated polyethylene with the complexing agent in the melt until a homogeneous mixture is obtained.

For blending of the two polymer components, it is preferred to use a conventional extruder although any apparatus in which one can mix the propylene polymer and the oxygenated polyethylene metal complex polymer into a homogenous composition at temperatures of 175–225° C. can be used.

The temperature at which the propylene polymer and the oxygenated polyethylene-metal complex are mixed should be chosen so that the polymers are softened enough to be worked easily, but not so high so that the polymers are thermally degraded. Operably, this range is about 50–275° C. although preferably, a temperature in the range of 175–225° C. is used so that the polymers are in the melt state.

The amount of oxygenated polyethylene-metal complex employed in the mixing step with the propylene polymer or propylene/ethylene copolymer is operably 1–20 weight percent based on total amount of polymer and preferably 1–15 weight percent.

The terminology "low temperature impact-resistant polypropylene composition" is used in the same sense as "brittle point" which is referred to in numerous patents, such as U.S. Patent 3,018,263. It is the measure of the temperature at which the polymer exhibits brittle failure under specific impact conditions as more fully pointed out hereinafter.

The percentages by weight are based upon the total amount of the propylene polymer and oxygenated polyethylene-metal complex used to form the crystalline propylene polymer compositions. Should other polymers or materials be added to the compositions of the present invention as they may, the weights of such added materials are excluded from weight percentage calculations.

In carrying out the reaction to make the ethylenepropylene copolymer component, the propylene and/or the ethylene are contacted with the catalyst at any temperature within the range of about −45° C. to about 95° C. Preferably, the reaction is carried out somewhat above room temperature and the particularly preferred temperature range is from about 21° C. to about 70° C. The catalyst employed can be any of those well-known in the art, such as $AlCl_3$ or $TiCl_3$ which can be used in conjunction with a hydrocarbon aluminum compound such as triethyl aluminum; triisobutyl aluminum; triisohexyl aluminum; trioctyl aluminum; dimethyl aluminum chloride; diethyl aluminum chloride; ethyl aluminum dichloride; or methyl aluminum dibromide. Other catalysts which are well-known in the art for the polypropylene reaction can likewise be employed in the process.

The following examples are given to illustrate the invention and are not intended to limit it in any manner. In the examples, all parts are expressed in parts by weight unless otherwise indicated.

Example 1

An oxygenated polyethylene-chromium complex was prepared in the following manner:

Commercially available polyethylene having a high load melt index (ASTM–1238–65T, Condition F) of 0.9, a density of 0.955, a reduced specific viscosity of 4.4, and a crystalline melting point of 135° C. was charged to a ribbon blender along with 0.5 weight percent benzoyl peroxide as an oxidation promoter and milled therein at 120° C. in air for 41 hours. The thus oxidized polymer had a melt index of 400, a reduced specific viscosity of 0.41, and contained 1.7 weight percent carbonyl and 0.47 milliequivalent carboxyl per gram polymer. The total chemically combined oxygen content was 3.1 weight percent.

100 parts by weight of the resultant oxidized polyethylene were then charged to a Brabender plastograph maintained at 150° C. and milled until molten. 7.5 parts by weight of $CrCl_3 \cdot 6H_2O$ were added to the molten oxidized polymer and milling was continued for 2 minutes. During the 2 minute milling period the torque increased 3,000 meter-grams. On characterization, the complexed polymer had a melt index of 0.07 (ASTM–1238–62T, Condition E) and a high load melt index of 1.9. The oxygenated polyethylene contained 0.4 percent by weight of chromium.

Example 2

30 g. of general purpose polypropylene resin having an intrinsic viscosity of about 3.2, an average molecular weight of about 420,000 and a melt index (ASTM–1238–62T, Condition L) of 3.4 were melt blended with 4.5 g. of the oxygenated polyethylene chromium complex prepared in Example 1, in a small-volume capacity extruder. Temperature of the melt blend was about 195° C. The resultant blend was extruded and analysis showed the final composition contained 15 weight percent oxygenated polyethylene-complex, the remainder being polypropylene.

A sample of the powdered polymer was melt spun in 5 mil diameter monofilaments. A 2 g. portion of the fiber was immersed in a dilute basic dyebath containing 1 weight percent alizarin. After 30 minutes at about 80° C. the fiber was removed from the dyebath and scrubbed with a 1 percent solution of a commercial detergent. The deep dark, violet-colored fiber was then rinsed with water and dried. No change in the color was observed when a sample of the dyed fiber was dry-cleaned at 50° C. for one hour in a solution made with carbon tetrachloride, ligroin, and amyl alcohol.

Example 3

Using the same general procedure as set forth in Example 1, an oxygenated polyethylene aluminum complex was prepared, except that 10 parts of aluminum monostearate were added to the oxidized polyethylene. 5 g. of this complex was then blended with 30 g. of polypropylene using the procedure of Example 2. The final composition contained 17 percent oxygenated polyethylene aluminum complex.

Monofilament prepared as in Example 2 was dyed in basic alizarin and treated as in Example 2. Final color of the fiber was a deep rose-red with no change in color after dry-cleaning.

Example 4

A control milled sample of polypropylene was treated as in Example 2, using the same conditions as in Example 2 during extruding, except that no complexed oxidized polyethylene was added. Monofilament prepared as in Example 2 and dyed in basic alizarin showed no dye susceptability. Additional physical properties of the propylene polymer compositions prepared in the foregoing examples are further illustrated in the following table illustrating the improved low temperature impact resistance of the compositions of the present invention.

TABLE

| Example No. | Melt index at 230° C. (1) | Percent polyethylene-metal complex (2) | Notched impact brittleness test temperature, ° C. (3) | Tensile impact, ft. lbs./in.² (4) |
|---|---|---|---|---|
| 2 | | 15 | −10 | 100 |
| 3 | | 17 | −12 | 107 |
| 4 (control) | 3.4 | 0 | +55 | 20 |

(1) ASTM-D1238-62T, Condition L.
(2) By infrared analysis.
(3) ASTM-D746-57T except that different sample bars (0.25" wide x 1.5" long x 0.075" thick) are cut from sheets pressed at 400° F. The sheets are cooled in the press at 25° F. per minute. The samples are placed in the tester with the width parallel to the impact bar. A notch 0.015" deep is cut across the thickness with a razor sharp edge.
(4) ASTM-D1822-61T.

It should be understood that other materials such as dyes, pigments, fibers, and other polymers may be introduced into the polypropylene compositions of the present invention without substantial alteration of the physical properties of the shaped structures formed from such compositions.

The polypropylene compositions formed in accordance with the present invention can be fabricated into useful articles in the same manner as polypropylene. For example, the compositions can be blow-molded, injection molded or extruded to form wastebaskets, bottles, tubing, fibers, films, and the like.

Many equivalent modifications will be apparent to those skilled in the art from a reading of the foregoing without a departure from the inventive concept.

What is claimed is:

1. A polymer composition comprising a blend of about 1 to 20 percent of an oxygenated polyethylene-metal complex, based on the total polymer present, and from 99 to 80 percent of a propylene polymer selected from the group consisting of polypropylene and propylene-ethylene copolymers; said composition having improved dyeability and improved low temperature impact resistance.

2. The propylene polymer composition of claim 1 wherein the oxygenated polyethylene-metal complex comprises a homogeneous mixture of
   (a) an oxidized polyethylene having a total chemically combined oxygen content in the range 0.20 to 7.5 weight percent oxygen and
   (b) from .2 to 50 percent by weight of the complex of a complexing agent selected from the group consisting of inorganic metal salts, metal salts of fatty acids having at least 8 carbon atoms and metal chelates, the metal being at least divalent.

3. The polymer composition of claim 2 wherein the complexing agent is a metal halide.

4. The polymer composition of claim 3 wherein the metal halide is a chromium chloride.

5. The polymer composition of claim 2 wherein the metal salt of a fatty acid having at least 8 carbon atoms is an aluminum carboxylate.

6. The polymer composition of claim 5 wherein the aluminum carboxylate is an aluminum stearate.

7. The polymer composition of claim 4 wherein the metal complexing agent is the chelate of a $\beta$-keto ester.

8. The composition of claim 7 wherein the chelate is a metal acetylacetonate.

9. The composition of claim 1 wherein the propylene polymer is polypropylene.

10. The process of preparing the composition of claim 1 which comprises melt-blending the propylene polymer selected from the group consisting of homopolymers of propylene and ethylene-propylene copolymers, and the oxygenated polyethylene complex at a temperature of 175° C. to 225° C.

References Cited

UNITED STATES PATENTS

| 2,984,634 | 5/1961 | Caldwell et al. | 260—94.9 |
| 3,148,936 | 9/1964 | Turbak | 260—94.9 |
| 3,153,025 | 10/1964 | Bush et al. | 260—94.9 |

DONALD E. CZAJA, Primary Examiner

DONALD J. BARRACK, Assistant Examiner

U.S. Cl. X.R.

8—4, 31, 55; 260—41, 94.9, 897